(12) United States Patent
Shirakawa et al.

(10) Patent No.: US 7,388,114 B2
(45) Date of Patent: Jun. 17, 2008

(54) PERFLUOROPOLYETHER DERIVATIVE

(75) Inventors: Daisuke Shirakawa, Yokohama (JP);
Takashi Okazoe, Yokohama (JP);
Kazuya Oharu, Yokohama (JP);
Shu-zhong Wang, Yokohama (JP);
Koichi Murata, Yokohama (JP); Kengo Kawahara, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/742,863

(22) Filed: May 1, 2007

(65) Prior Publication Data

US 2007/0203366 A1      Aug. 30, 2007

Related U.S. Application Data

(60) Division of application No. 11/107,980, filed on Apr. 18, 2005, now Pat. No. 7,230,140, which is a continuation of application No. PCT/JP03/13313, filed on Oct. 17, 2003.

(30) Foreign Application Priority Data

Oct. 18, 2002 (JP) ............................. 2002-304641

(51) Int. Cl.
*C07C 43/12* (2006.01)
(52) U.S. Cl. ................. 568/615; 568/677; 568/679; 568/680
(58) Field of Classification Search .................. None
See application file for complete search history.

(56) References Cited

U.S. PATENT DOCUMENTS

| | | | |
|---|---|---|---|
| 3,976,603 A | 8/1976 | Caporiccio et al. | 528/401 |
| 4,085,137 A | 4/1978 | Mitsch et al. | 260/561 |
| 5,093,432 A | 3/1992 | Bierschenk et al. | 525/331.6 |
| 5,246,588 A | 9/1993 | Tonelli et al. | 210/656 |
| 5,262,057 A | 11/1993 | Tonelli et al. | 210/656 |
| 5,266,650 A | 11/1993 | Guerra et al. | 525/326.4 |
| 5,322,903 A | 6/1994 | Bierschenk et al. | 525/331.6 |
| 5,382,614 A | 1/1995 | Scarati et al. | 524/108 |
| 5,466,877 A | 11/1995 | Moore | 562/852 |
| 5,910,614 A | 6/1999 | Turri et al. | 568/615 |
| 6,132,860 A | 10/2000 | Bruxvoort et al. | 428/323 |
| 6,162,521 A | 12/2000 | Falcone | 428/65.4 |
| 6,350,306 B1 | 2/2002 | Tonelli et al. | 106/287.26 |
| 6,509,509 B2 | 1/2003 | Tonelli et al. | 568/606 |
| 2002/0090515 A1 | 7/2002 | Pellerite et al. | 428/406 |
| 2006/0252910 A1 | 11/2006 | Shirakawa et al. | 528/401 |

FOREIGN PATENT DOCUMENTS

| | | |
|---|---|---|
| CN | 1263551 A | 8/2000 |
| EP | 436628 | 7/1991 |
| JP | 50-104299 | 8/1975 |
| JP | 6-44557 | 2/1994 |
| JP | 07-018083 | 1/1995 |
| JP | 2000-169481 | 6/2000 |
| JP | 2001-255643 | 9/2001 |
| WO | 90/03409 | 4/1990 |
| WO | 90/03410 | 4/1990 |
| WO | 90/06296 | 6/1990 |
| WO | 02/088218 | 11/2002 |

OTHER PUBLICATIONS

Tonelli et al, J. Fluorine Chem., vol. 95, 1999, pp. 51-70.
Fong et al, IEEE Transactions on Magnetics, vol. 35, No. 2, 1999, pp. 911-915.
Scheirs, Modern Fluoropolymers, John Wiley & Sons, Ltd., 1997, pp. 466-468.
Kasei, Macromolecules, vol. 25, 1992, p. 6791.
U.S. Appl. No. 11/742,863, filed May 1, 2007, Shirakawa et al.
U.S. Appl. No. 11/626,597, filed Jan. 24, 2007, Shirakawa et al.

*Primary Examiner*—Rosalynd Keys
(74) *Attorney, Agent, or Firm*—Oblon, Spivak, McClelland, Maier & Neustadt, P.C.

(57) ABSTRACT

A novel perfluoropolyether derivative which is less likely to undergo decomposition, which is free from a problem of deterioration during its use, and which is useful as a lubricating oil or a coating agent, is provided.

A compound represented by the following formula (1):

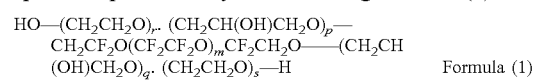

wherein m represents an integer of from 3 to 200, and each of p, q, r and s which are independent of one another, represents an integer of from 0 to 100, provided that when each of p, q, r and s which are independent of one another, is an integer of at least 1, the arrangement of $-(CH_2CH_2O)-$ and $-(CH_2CH(OH)CH_2O)-$ units is not particularly limited, and when one of r and p is an integer of at least 2 and the other is an integer of at least 1, or when one of q and s is an integer of at least 2 and the other is an integer of at least 1, these units may be arranged in a block form or at random.

9 Claims, No Drawings

PERFLUOROPOLYETHER DERIVATIVE

CROSS-REFERENCE TO RELATED APPLICATIONS

The present application is a divisional of U.S. Ser. No. 11/107,980, filed on Apr. 18, 2005, which is a continuation of PCT/JP03/13313, filed on Oct. 17, 2003, which claims priority to JP 2002-304641, filed on Oct. 18, 2002.

TECHNICAL FIELD

The present invention relates to a compound represented by the formula (1), i.e. a novel perfluoropolyether derivative, useful as a lubricant, a coating agent, etc.

BACKGROUND ART

Perfluorinated polyether compounds are compounds widely used as a lubricating oil, a coating agent, etc. Among such compounds, a derivative of which the terminal group is —$CH_2OH$ is known to be particularly useful. For example, a compound represented by the following formula (A) (in the formula (A), each of a and b represents an integer of at least 1) has been known (e.g. JP-A-6-44557 (page 2), C. Tonelli et al, J. Fluorine Chem., vol. 95, 1999, pages 51 to 70):

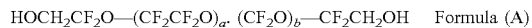
$HOCH_2CF_2O$—$(CF_2CF_2O)_a$·$(CF_2O)_b$—$CF_2CH_2OH$     Formula (A)

However, the compound represented by the formula (A) has —$OCF_2O$— units derived from —($CF_2O$)— units as an essential component in its molecular structure, and thus it undergoes decomposition due to the above units, which may cause deterioration (e.g. W. Fong et al, IEEE Transactions on Magnetics, vol. 35, No. 2, March 1999, pages 911 to 912, J. Scheirs, Modern Fluoropolymers, John Wiley & Sons Ltd., 1997, pages 466 to 468, P. H. Kasai, Macromolecules, vol. 25, 1992, page 6791).

As a compound having no —$OCF_2O$— units, a compound wherein the terminal groups (—$CH_2OH$) in the formula (A) are —COOH groups, has been known. However, the compound wherein the terminals are —COOH groups has such a drawback that when it is exposed under high temperature conditions, the polar terminal groups (—COOH) easily undergo decarbonylation and are lost, and thus such properties that the surface coating properties repair in short time (also called self-repair properties) decrease. Further, it has such a drawback that it may cause corrosion since the —COOH groups have high acidity.

Further, there is a literature which discloses a compound represented by the following formula (B) as a surface active agent (JP-A-9-111286 (page 1)). However, the literature does not disclose a compound represented by the formula (B) wherein q is 0. Further, specifically disclosed compounds are all known perfluoropolyether surface active agents, and they correspond to compounds wherein q is at least 1:

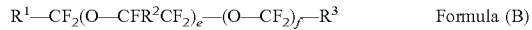
$R^1$—$CF_2(O$—$CFR^2CF_2)_e$—$(O$—$CF_2)_f$—$R^3$     Formula (B)

wherein $R^1$ represents F or a hydrophilic group, $R^2$ represents F or $CF_3$, $R^3$ represents a hydrophilic group, each of e and f is an integer of from 0 to 1,000, and one of them may be 0, the oxyperfluoro groups in the brackets may not necessarily be arranged in this order, and may be randomly polymerized, or may be alternately polymerized so that the oxyperfluoro groups are alternately arranged.

DISCLOSURE OF THE INVENTION

The present invention has been made to overcome the above problems, and it is an object of the present invention to provide a compound represented by the formula (1), i.e. a novel perfluoropolyether derivative, which is less likely to be decomposed, which is free from a problem of deterioration during its use, and which is useful as a lubricating oil or a coating agent.

The present invention provides a compound represented by the following formula (1) and a perfluoropolyether derivative composition comprising at least two types of the compounds:

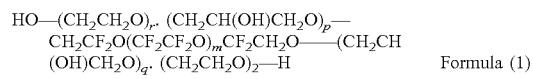
HO—$(CH_2CH_2O)_r$·$(CH_2CH(OH)CH_2O)_p$—
$CH_2CF_2O(CF_2CF_2O)_m CF_2CH_2O$——$(CH_2CH(OH)CH_2O)_q$·$(CH_2CH_2O)_s$—H     Formula (1)

wherein m represents the number of —($CF_2CF_2O$)— units and is an integer of from 3 to 200, each of r and s which are independent of each other, represents the number of —($CH_2CH_2O$)— units and is an integer of from 0 to 100, and each of p and q which are independent of each other, represents the number of —($CH_2CH(OH)CH_2O$)— units and is an integer of from 0 to 100, provided that when each of r and p which are independent of each other, is an integer of at least 1, or when each of q and s which are independent of each other, is an integer of at least 1, the arrangement of —($CH_2CH_2O$)— and —($CH_2CH(OH)CH_2O$)— units is not particularly limited, and when one of r and p is an integer of at least 2 and the other is an integer of at least 1, or when one of q and s is an integer of at least 2 and the other is an integer of at least 1, —($CH_2CH_2O$)— and —($CH_2CH(OH)CH_2O$)— units may be arranged in a block form or at random.

The present invention further provides a compound represented by the following formula (1-1) and a perfluoropolyether derivative composition comprising at least two types of the derivatives:

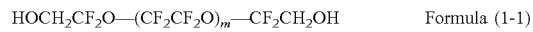
$HOCH_2CF_2O$—$(CF_2CF_2O)_m$—$CF_2CH_2OH$     Formula (1-1)

(wherein m represents the number of —($CF_2CF_2O$)— units and is an integer of from 3 to 200).

The present invention further provides a solution composition containing a compound represented by the following formula (1) and an organic solvent:

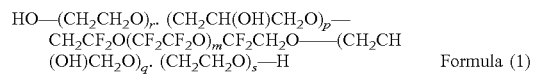
HO—$(CH_2CH_2O)_r$·$(CH_2CH(OH)CH_2O)_p$—
$CH_2CF_2O(CF_2CF_2O)_m CF_2CH_2O$——$(CH_2CH(OH)CH_2O)_q$·$(CH_2CH_2O)_s$—H     Formula (1)

wherein the symbols are as defined above.

According to the present invention, a novel perfluoropolyether derivative which is less likely to be decomposed, which is free from a problem of deterioration or corrosion during its use, and which is useful as a lubricating oil or a coating agent, is provided. The perfluoropolyether derivative of the present invention is a compound which can be produced from a material easily available at a low cost. Further, according to the present invention, a solution composition containing the perfluoropolyether derivative and an organic solvent is provided. The solution composition is useful as e.g. a surface treating agent. On the surface of a treated base material obtained by coating the surface treating agent on the surface of a base material, followed by drying, a coating film free from defects such as pinholes, being transparent, having a low refractive index and excellent in heat resistance and chemical resistance, is formed.

BEST MODE FOR CARRYING OUT THE INVENTION

In the following explanation in the present specification, explanation regarding the compound represented by the formula (1) is similarly applied to the compound represented by the formula (1-1), unless otherwise specified.

The present invention provides a compound represented by the following formula (1) and a compound represented by the formula (1-1):

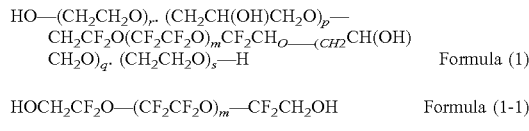  Formula (1)

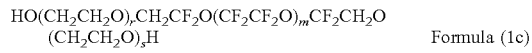  Formula (1-1)

wherein m represents the number of —(CF$_2$CF$_2$O)— units and is an integer of from 3 to 200, each of r and s which are independent of each other, represents the number of —(CH$_2$CH$_2$O)— units and is an integer of from 0 to 100, and each of p and q which are independent of each other, represents the number of —(CH$_2$CH(OH)CH$_2$O)— units and is an integer of from 0 to 100, provided that when each of r and p which are independent of each other, is an integer of at least 1, or when each of q and s which are independent of each other, is an integer of at least 1, the arrangement of —(CH$_2$CH$_2$O)— units and —(CH$_2$CH(OH)CH$_2$O)— units is not particularly limited, and when one of r and p is an integer of at least 2 and the other is an integer of at least 1, or when one of q and s is an integer of at least 2 and the other is an integer of at least 1, —(CH$_2$CH$_2$O)— and —(CH$_2$CH(OH)CH$_2$O) — units may be arranged in a block form or at random.

In the compound represented by the formula (1), if a structure in which the —(CH$_2$CH$_2$O)— and —(CH$_2$CH(OH)CH$_2$O)— units are connected is present, the arrangement of these units is not particularly limited. For example, when r and p are 1 (or when q and s are 1), the unit present on the terminal hydroxide group side may be either the —(CH$_2$CH$_2$O)— unit or the —(CH$_2$CH(OH)CH$_2$O)— unit.

Further, when one of r and p is at least 2 and the other is at least 1, —(CH$_2$CH$_2$O)— and —(CH$_2$CH(OH)CH$_2$O)— units may be arranged in a block form or at random. Similarly, when one of q and s is at least 2 and the other is 1, —(CH$_2$CH$_2$O)— and —(CH$_2$CH(OH)CH$_2$O)— units may be arranged in a block form or at random.

In the compound represented by the formula (1) and the compound represented by the formula (1-1), m is preferably an integer of from 3 to 100, particularly preferably an integer of from 3 to 70, especially preferably an integer of from 5 to 50.

The compound represented by the formula (1) can be classified into a compound in which —(CH$_2$CH$_2$O)— and/or —(CH$_2$CH(OH)CH$_2$O)— units are present, and a compound represented by the formula (1-1) wherein no such units are present.

In the compound represented by the formula (1) wherein —(CH$_2$CH$_2$O)— and/or —(CH$_2$CH(OH)CH$_2$O)— units are present, each of r and s which are independent of each other, is an integer of from 1 to 100, and/or each of p and q which are independent of each other, is an integer of from 1 to 100.

Each of r and s which represents the number of —(CH$_2$CH$_2$O)— units, which are independent of each other, is preferably an integer of from 1 to 10, particularly preferably an integer of from 1 to 2, especially preferably 1. Each of p and q which represents the number of —(CH$_2$CH(OH)CH$_2$O)— units, which are independent of each other, is preferably an integer of from 1 to 10, particularly preferably an integer of from 1 to 2, especially preferably 1.

The compound represented by the formula (1) wherein —(CH$_2$CH$_2$O)— and/or —(CH$_2$CH(OH)CH$_2$O)— units are present is preferably a compound represented by the following formula (1c) wherein —(CH$_2$CH$_2$O)— units alone are present, or a compound represented by the following formula (1d) wherein —(CH$_2$CH(OH)CH$_2$O)— units alone are present:

HO(CH$_2$CH$_2$O)$_r$CH$_2$CF$_2$O(CF$_2$CF$_2$O)$_m$CF$_2$CH$_2$O(CH$_2$CH$_2$O)$_s$H  Formula (1c)

HO(CH$_2$CH(OH)CH$_2$O)$_p$CH$_2$CF$_2$O(CF$_2$CF$_2$O)$_m$CF$_2$CH$_2$O(CH$_2$CH(OH)CH$_2$O)$_q$H  Formula (1d)

wherein m, r, s, p and q are as defined above, and the preferred modes are also as defined above. The compound of the formula (1c) is preferably a compound wherein r and s are simultaneously 1, and the compound of the formula (1d) is preferably a compound wherein p and q are simultaneously 1.

The compound represented by the formula (1-1) wherein no —(CH$_2$CH$_2$O)— nor —(CH$_2$CH(OH)CH$_2$O)— units are presents is preferably a compound wherein m is within the above preferred range.

The compound represented by the formula (1) of the present invention may be present as a single compound but may be present as a composition comprising at least two types of compounds wherein the values of m, r, s, p and q are different, and the latter is preferred in view of easiness of availability.

Namely, the present invention provides a perfluoropolyether derivative composition comprising at least two types of the compounds represented by the formula (1). The composition may be represented by an average molecular formula represented by the following formula (1b).

Further, a composition comprising at least two types of the compounds represented by the formula (1-1) may be represented by an average molecular formula represented by the following formula (1-1b):

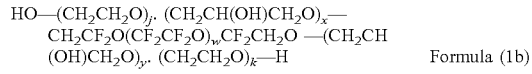  Formula (1b)

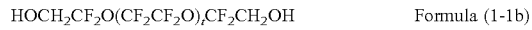  Formula (1-1b)

In the formula (1b), w represents the average of the number of —(CF$_2$CF$_2$O)— units and is a positive number of from 3 to 200, preferably a positive number of from 3 to 100. Each of j and k which are independent of each other, represents the average of the number of —(CH$_2$CH$_2$O)— units and is a positive number of from 0 to 100, preferably a positive number of from 1 to 10, particularly preferably a positive number of from 1 to 2. Each of x and y which are independent of each other, represents the average of the number of —(CH$_2$CH(OH)CH$_2$O)— units and is a positive number of from 0 to 100, preferably a positive number of from 1 to 10, particularly preferably a positive number of from 1 to 2. Further, if the compound of the formula (1b) has a structure in which —(CH$_2$CH$_2$O)— and —(CH$_2$CH(OH)CH$_2$O)— units are connected, the arrangement of these units is not particularly limited. Further, when the number of either —(CH$_2$CH$_2$O)— units or —(CH$_2$CH(OH)CH$_2$O)— units is at least 2, and the number of the other units is at least 1, these units may be arranged in a block form or at random.

In the formula (1-1b), t represents the average of the number of —(CF$_2$CF$_2$O)— units and is a positive number of higher than 3 and less than 200. t is preferably a positive number of higher than 3 and at most 100, particularly preferably a positive number of higher than 3 and at most 70, especially preferably a positive number of from 5 to 50.

The compound represented by the formula (1) of the present invention is a compound having substantially no units represented by —$OCF_2O$—. The compound having substantially no units represented by —$OCF_2O$— is a compound having practically no —$(OCF_2O)$— units in the structure of the compound represented by the formula (1), or a compound having such units, if any, in an undetectable amount by quantitative determination by means of conventional analysis means (such as $^{19}$F-NMR) which may detect the —$(OCF_2O)$— units.

The compound represented by the formula (1-1) may be produced by the same process as a method as disclosed in e.g.

WO02/4397 by the present inventors from a polyethylene glycol having a carbon skeleton corresponding to the compound. Polyethylene glycols having various molecular weights are commercially available at a low cost and easily available. Further, compounds represented by the formula (1) wherein each of r, p, q and s which are independent of one another, is at least 1, can be produced by a process as described hereinafter from the compound represented by the formula (1-1).

Namely, as the process for producing the compound represented by the formula (1-1), a polyethylene glycol represented by the following formula (a) is reacted with a perfluoroacyl fluoride represented by the following formula (b) to obtain a partially fluorinated ester represented by the following formula (c), which is reacted with fluorine in a liquid phase to obtain a compound represented by the formula (d), and the ester linkages of the compound represented by the formula (d) are decomposed to obtain a compound represented by the following formula (e). Then, the compound represented by the formula (e) is esterified to obtain a compound represented by the formula (f) wherein r is an alkyl group. Otherwise, the compound represented by the formula (e) is hydrolyzed to obtain a compound represented by the formula (f) wherein r is a hydrogen atom. Then, the compound represented by the formula (f) obtained by the above process is reduced. The compound (1-1) produced by the above process is a compound having substantially no —$OCF_2O$— units.

| | |
|---|---|
| $HOCH_2CH_2O(CH_2CH_2O)_kCH_2CH_2OH$ | Formula (a) |
| $R^fCOF$ | Formula (b) |
| $R^fCOOCH_2CH_2O(CH_2CH_2O)_kCH_2CH_2OCOR^f$ | Formula (c) |
| $R^fCOOCF_2CF_2O(CF_2CF_2O)_mCF_2CF_2OCOR^f$ | Formula (d) |
| $FCOCF_2O(CF_2CF_2O)_mCF_2COF$ | Formula (e) |
| $ROCOCF_2O(CF_2CF_2O)_mCF_2COOR$ | Formula (f) |
| $HOCH_2CF_2O(CF_2CF_2O)_mCF_2CH_2OH$ | Formula (1-1) |

In the above formulae, m is as defined above, k represents an integer of at least m, $R^f$ represents a monovalent perfluorinated organic group and is preferably a perfluoroalkyl group or a perfluoroalkyl group containing an ethereal oxygen atom, and R represents an alkyl group or a hydrogen atom.

Further, the compound represented by the formula (f) wherein R is an alkyl group may be obtained by a process of subjecting the compound represented by the formula (d) obtained by the above process and an alcohol compound represented by the formula $R^1$—OH (wherein $R^1$ represents an alkyl group corresponding to R) to ester exchange.

In fluorination of the compound represented by the formula (c), the carbon-carbon linkage may be broken, and thus the number (k) of —$(CH_2CH_2O)$— units in the formulae (a) and (c) is an integer equal to m or an integer higher than m.

As the compound represented by the formula (a) as a starting material in this production process, a mixture of at least two types wherein the numbers of the —$(CH_2CH_2O)$— units are different is easily available in usual case, and accordingly the compound represented by the formula (1-1) is also preferably produced as corresponding at least two types of compounds wherein the numbers of —$(CF_2CF_2O)$— units are different, in view of easiness of production.

In the above reaction, esterification of the compound represented by the formula (a), fluorination of the compound represented by the formula (b) and decomposition of the ester linkages of the compound represented by the formula (c) can be carried out in accordance with a method as disclosed in e.g. WO02/4397. Further, conversion of the compound represented by the formula (e) to the compound represented by the formula (f) (esterification, hydrolysis) may be carried out in accordance with a known method.

The reduction of the compound (f) may be carried out in accordance with a method as disclosed in e.g. JP-A-10-72568. The reduction is carried out preferably by using a reducing agent such as $NaBH_4$, borane-THF or lithium aluminum hydride.

Further, the compound represented by the formula (1) wherein each of r and s which are independent of each other, is at least 1, may be produced by adding ethylene carbonate or ethylene oxide to the compound represented by the formula (1-1). Further, the compound represented by the formula (1) wherein each of p and q which are independent of each other, is at least 1, may be produced by adding 2,3-epoxy-1-propanol to the compound represented by the formula (1-1). Addition of ethylene carbonate, ethylene oxide or 2,3-epoxy-1-propanol may be carried out by adding such a compound in an optional amount in an optional order depending upon the structure of the aimed compound.

Such addition may be carried out in accordance with a known method. The addition may be carried out in the presence or absence of a solvent, and it is preferably carried out in the presence of a solvent since compatibility of the compound represented by the formula (1-1) with ethylene carbonate, ethylene oxide or 2,3-epoxy-1-propanol will be improved. The solvent is preferably a hydrocarbon ether or a hydrochlorofluorocarbon, particularly preferably (t-butyl) methyl ether. The hydrochlorofluorocarbon may be a known hydrochlorofluorocarbon, and it may, for example, be 1,1-dichloro-1-fluoroethane, 2,2,2-trifluoro-1,1-dichloroethane or dichloropentafluoropropane.

By the above addition, a product having one —$(CH_2CH_2O)$— unit or —$(CH_2CH(OH)CH_2O)$— unit added to each of the hydroxyl groups on both terminals of the compound represented by the formula (1-1) can be obtained with high efficiency. The reason is considered to be because the hydroxyl groups in the compound represented by the formula (1-1) and the hydroxyl groups formed by the addition (i.e. the hydroxyl groups present as —$CH_2CH_2OH$ or —$CH_2CH(OH)CH_2OH$) have different properties such as acidity, and thus no further addition is likely to occur on the hydroxyl groups formed by the addition.

The compound represented by the formula (1) produced by the above process is preferably subjected to a purification treatment in accordance with the purpose of use and used for the aimed application in usual case.

The compound represented by the formula (1) provided by the present invention is a compound useful for application as e.g. a lubricating oil or a surface treating agent to impart to the surface of a base material functions such as low refractive index properties, heat resistance, lubricating properties, adhesive properties, antiglare properties, moisture resistance, stain resistance, water and oil repellency, chemical resistance, abrasion resistance and electrostatic resistance.

When used for the above application, usually the compound represented by the formula (1) is preferably used as a solution composition with an organic solvent. Namely, the present invention provides a solution composition containing the compound represented by the formula (1) and an organic solvent. The compound represented by the formula (1) contained in the composition may be one type or at least two types, preferably at least two types. The organic solvent is not particularly limited and may be an organic solvent capable of forming a dispersion, a suspension, an emulsion or a solution of the derivative, and preferably an organic solvent capable of forming a solution from reasons as described hereinafter.

As the organic solvent, preferably a fluorine-containing organic solvent is essentially used. Specifically, the fluorine-containing organic solvent may, for example, be a fluorine-containing benzene such as 1,3-bis(trifluoromethyl)benzene; a perfluoroalkane such as perfluoromethyldecalin or perfluoromethylcyclohexane (tradename: Fluorinert FC-72, etc.); a (poly or per)fluoromonoether such as (poly or per)fluorodialkyl ether or alkyl (perfluoroalkyl) ether (tradename: Fluorinert FC-75, Fluorinert FC-77, etc.); a perfluoropolyether (tradename: Krytox, FOMBLIN, Galden, DEMNUM, etc.); a chlorofluorocarbon; a hydrochlorofluorocarbon; a hydrofluorocarbon; a chlorofluoropolyether; a hydrochlorofluoropolyether; a hydrofluoropolyether; or a perfluoroalkylamine such as perfluorotrialkylamine (such as perfluoro(t-butyl)amine or perfluoro(t-propyl)amine). Further, the organic solvent is preferably a fluorine-containing benzene, a perfluoroalkane, a perfluoroalkylamine, a perfluoropolyether or a perfluoromonoether, particularly preferably a perfluoroalkylamine.

Further, when the compound represented by the formula (1) has —(CH$_2$CH$_2$O)— units and/or (CH$_2$CH(OH)CH$_2$O)— units, when the number of these units increases, the solubility in a solvent, the acidity of the hydroxyl groups at molecular terminals, the viscosity of the compound, the boiling point of the compound, etc. change. For example, a compound having a large number of these units tends to have increased solubility in a non-fluorine organic solvent. Accordingly, when a solution composition is formed, it is preferred to add a non-fluorine solvent to the above fluorine-containing organic solvent to adjust the solubility of the compound represented by the formula (1). The non-fluorine organic solvent may be a hydrocarbon solvent (e.g. an alkane such as hexane) or a hydrocarbon ether such as (t-butyl) methyl ether.

The solution composition containing the compound represented by the formula (1) and an organic solvent may be used also as a surface treating agent such as a coating agent. A treated base material having a coating film formed from the solution composition formed on its surface may have the above functions imparted to its surface.

The material of the base material may be an inorganic material, an organic material, a combination thereof or the like. The inorganic material and the organic material may be composed of one type or at least two types.

The inorganic material may, for example, be a metal, a ceramic or glass, and the organic material may, for example, be a resin (such as polyamide, polyimide, polyester, polycarbonate, polyvinyl alcohol, polyacrylonitrile, polyvinyl chloride, polyethylene or polypropylene). The combination of an inorganic material and an organic material may be a composite material or a laminated material of an inorganic material and an organic material.

When the solution composition is used as a surface treating agent, the concentration of the compound represented by the formula (1) in the composition is preferably from 0.01 to 50 mass %, particularly preferably from 0.01 to 20 mass %.

The organic solvent is preferably a solvent which dissolves the compound represented by the formula (1) well and forms a solution, and specifically, it may be perfluoro(t-butyl)amine, perfluoro(t-propyl)amine, 1,3-bis(trifluoromethyl)benzene, perfluoromethyldecalin or perfluoromethylcyclohexane. When such a solvent is used, a uniform coating film without an irregularity in thickness can be formed on the surface of the base material.

The surface treating agent may contain a component other than the compound represented by the formula (1) and the organic solvent (hereinafter referred to as other component). The other component may optionally be selected in accordance with the purpose of use of the solution composition. For example, a silane, epoxy, titanium or aluminum coupling agent may be blended so as to improve the adhesive properties between the base material and the compound represented by the formula (1). Further, when it is used as a lubricant, a radical scavenger (X-1p, tradename, manufactured by Dow Chemicals) may be contained as the other component.

When it is used as a surface treating agent, treatment is carried out preferably by coating the solution composition on the surface of the base material by various methods, followed by drying. Further, another surface treating agent may be preliminarily applied to the surface of the base material, or a physical treatment may be applied. The treatment method is preferably a coating method, and it may, for example, be roll coating, cast coating, dip coating, spin coating, water cast coating, die coating or Langmuir Blodgett. When the treatment is carried out by coating, physical properties (such as boiling point and viscosity) of the organic solvent in the solution composition are preferably selected optionally considering easiness of treatment and easiness of drying. For example, when dip coating is employed, the organic solvent is preferably perfluoro(t-propyl)amine or perfluoro(t-butyl)amine.

On the surface of the base material on which the surface treating agent is applied by the above method and dried, a coating film obtained by drying the surface treating agent is formed. When the surface treating agent prepared to have the above preferred concentration is coated, the thickness of the coating film is at a level of from 0.001 to 50 μm in usual case. The thickness of the coating film is optionally changed in accordance with the purpose of use.

The present invention further provides a treated base material having such a coating film formed on its surface. The treated base material may be used for various applications. Further, a thin film obtained by peeling the coating film from the treated base material be used for various applications.

The solution composition provided by the present invention may be used for the following applications to provide a useful treated base material or thin film. It may, for example, be a lubricant such as a lubricating film for a hard disk recording medium; an adhesive such as an adhesive for a semiconductor device (an adhesive for lead on chip (LOC) tape, an adhesive for a die bonding or an adhesive for fixation of a pellicle membrane); an optical material such as a coating agent for an optical waveguide material, for a lens material or for an antireflection film for a display, or a composition for formation of a pellicle membrane (e.g. for KrF or for ArF) or formation of an antireflection film for a resist; or an electrical and electric material such as an ink repellency agent (e.g. for coating or for a printing device such as an ink jet printer), a composition for a wire coating material, a composition for formation of a protective film for a semiconductor (such as a buffer coating film, a passivation film, a semiconductor device α-ray shielding film or a moistureproof coating agent), or a composition for formation of an interlayer insulating film (e.g. for a semiconductor device, for a liquid crystal display or for a multilayer wiring board).

When the solution composition containing the compound represented by the formula (1) and an organic solvent is used as the surface treating agent, an effect of imparting a function stable for a long term to a base material will be obtained.

EXAMPLES

Now, the present invention will be explained in detail. However, the present invention is by no means restricted thereto. In the following, tetramethylsilane will be referred to as TMS, $CCl_2FCClF_2$ will be referred to as R-113, $CClF_2CF_2CCl_2F$ will be referred to as R-215ca, dichloropentafluoropropane will be referred to as R-225, $CClF_2CF_2CFHCl$ will be referred to as R-225cb, and $CClF_2CF_2CCl_2CF_2CF_3$ will be referred to as R-419.

Further, the average molecular weight is represented by the number average molecular weight (Mn) or the mass average molecular weight (Mw), and measured by gel permeation chromatography (hereinafter referred to as GPC). The measuring method by GPC was in accordance with a method as disclosed in JP-A-2001-208736. Specifically, ASAHIKLIN AK-225SEC grade 1 (tradename, manufactured by Asahi Glass Company, Limited) was used as a mobile phase, and two PL gel MIXED-E columns (tradename, manufactured by Polymer Laboratories Ltd.) were connected in series to obtain a column for analysis. As standard samples for molecular weight measurement, four perfluoropolyethers having a molecular weight distribution represented by Mw/Mn of less than 1.1 and having molecular weights of from 2,000 to 10,000 and one perfluoropolyether having a molecular weight distribution of at least 1.1 and having a molecular weight of 1,300 were used. The mobile phase flow rate was 1.0 mL/min, the column temperature was 37° C., and as a detector, a differential refractometer or an evaporative light scattering detector was used.

Example 1

Example for production of $CF_3CF_2CF_2OCF(CF_3)CF_2O$ $CF(CF_3)C(O)OCH_2CH_2O(CH_2CH_2O)_pCH_2CH_2OCOCF(C$ $F_3)OCF_2CF(CF_3)OCF_2CF_2CF_3$ (the average of p: 20.4)

Commercially available polyethylene glycol (10 g) $(HOCH_2CH_2O(CH_2CH_2O)_pCH_2CH_2OH$ (the average of p: 20.4), R-225 (20 g), NaF (1.2 g) and pyridine (1.6 g) were put in a flask and vigorously stirred while keeping the internal temperature at 25° C., and a nitrogen gas was bubbled. $FCOCF(CF_3)OCF_2CF(CF_3)OCF_2CF_2CF_3$ (15 g) was dropwise added thereto over a period of 1.0 hour while keeping the internal temperature at 25° C. or higher. After completion of the dropwise addition, stirring was carried out at 50° C. for 12 hours and then at room temperature for 24 hours, and a crude liquid was recovered. The crude liquid was subjected to filtration under reduced pressure, and then the recovered liquid was dried by a vacuum dryer (100° C., 666.5 Pa) for 12 hours. The crude liquid thus obtained was dissolved in R-225 (100 mL) and washed with a saturated baking soda solution (1,000 mL) three times, and the organic phase was recovered. Then, magnesium sulfate (1.0 g) was added to the recovered organic phase, followed by stirring for 12 hours. Then, filtration under pressure was carried out to remove magnesium sulfate, and R-225 was distilled off by an evaporator to obtain a polymer (18.5 g) which was liquid at room temperature. As a result of $^1$H-NMR and $^{19}$F-NMR, it was confirmed that the obtained polymer was the title compound and Mn was 1,960.

$^1$H-NMR (300.4 MHz, solvent: $CDCl_3$, standard: TMS) δ (ppm) 3.4 to 3.8, 4.5

$^{19}$F-NMR (282.7 MHz, solvent: $CDCl_3$, standard: $CFCl_3$) δ (ppm): −76.0 to −81.0, −81.0 to −82.0, −82.0 to −82.5, −82.5 to −85.0, −128.0 to −129.2, −131.1, −144.7

Example 2

Example for production of $CF_3CF_2CF_2OCF(CF_3)CF_2O$ $CF(CF_3)C(O)OCF_2CF_2O(CF_2CF_2O)_qCF_2CF_2OCOCF(C$ $F_3)OCF_2CF(CF_3)OCF_2CF_2CF_3$ Example 2-1

Production Example employing R-113 as reaction solvent

R-113 (312 g) was added to a 500 mL autoclave made of hastelloy, stirred and kept at 25° C. At the autoclave gas outlet, a condenser kept at 20° C., a NaF pellet packed bed and a condenser kept at −20° C. were disposed in series. A liquid return line which returns the condensed liquid to the autoclave was disposed from the condenser kept at −20° C. After a nitrogen gas was blown for 1.0 hour, a fluorine gas diluted to 10% with a nitrogen gas (hereinafter referred to as 10% fluorine gas) was blown at a flow rate of 19.2 L/h for 1 hour.

Then, while blowing the 10% fluorine gas at the same flow rate, a solution having the product (3.0 g) obtained in Example 1 dissolved in R-113 (150 g) (hereinafter referred to as R-113 solution) was injected over a period of 5 hours.

Then, while blowing the 10% fluorine gas at the same flow rate, 6 mL of the R-113 solution was injected, then the reaction was continued while blowing the nitrogen gas for 1.0 hour.

After completion of the reaction, the solvent was distilled off by vacuum drying (60° C., 6.0 h) to obtain a product (4.85 g) which was liquid at room temperature. As a result of analysis of the product, formation of the title compound was confirmed. The average molecular weight (Mn) as obtained from GPC was 3,650. q in the title compound is a value with which Mn measured under conditions of the present Example can be 3,690. Further, it was confirmed that the product obtained in Example 2 was a compound having at lest 99.9 mol % of hydrogen atoms in the product obtained in Example 1 substituted by fluorine atoms.

$^1$H-NMR (300.4 MHz, solvent: R-113, standard: TMS) δ (ppm): 5.9 to 6.4

$^{19}$F-NMR (282.7 MHz, solvent: R-113, standard: CFCl$_3$) δ (ppm): −77.5 to −86.0, −89.5, −90.0 to −92.0, −120.0 to −139.0, −142.0 to −146.0

Example 2-2

Production Example employing R-419 as reaction solvent

The reaction was carried out in the same manner as in Example 2-1 except that R-419 was used instead of R-113. As a result of analysis of the product, formation of the same product as the product of Example 2-1 was confirmed.

Example 3

Example for production of FC(O)CF$_2$O(CF$_2$CF$_2$O)$_q$CF$_2$COF

The interior of a 50 mL round flask in which a stirrer chip was charged, was adequately flushed with nitrogen. 1,1,3,4-tetrachlorohexafluorobutane (13.4 g), KF (0.13 g) and the product (3.7 g) obtained in Example 2-1 were added to the round flask, vigorously stirred and kept at 120° C. At the outlet of the round flask, a condenser kept at 20° C. and a dry ice/ethanol cooling tube were disposed in series to carry out nitrogen sealing.

8 Hours later, the internal temperature was decreased to room temperature, and then a vacuum pump was disposed to the condenser to keep the interior of the system under reduced pressure, and the solvent and reaction by-products were distilled off. 3 Hours later, a product (2.7 g) which was liquid at room temperature was obtained.

As a result of analysis of the product, it was confirmed that at least 99% of the total number of ester linkages in the product obtained in Example 2-1 were substituted by —COF, and the title compound (wherein q is as defined above) was formed.

$^1$H-NMR (300.4 MHz, solvent: R-113, standard: TMS) δ (ppm): 5.9 to 6.4

$^{19}$F-NMR (282.7 MHz, solvent: R-113, standard: CFCl$_3$) δ (ppm): 12.7, −78.1, −89.5, −90.0 to −92.0, −135.0 to −139.0

Example 4

Example for production of CH$_3$OC(O)CF$_2$O(CF$_2$CF$_2$O)$_q$CF$_2$COOCH$_3$

Example 4-1

Production Example by esterification

R-113 (1.0 g) was charged in a round flask in which the product of Example 3 was put, and vigorously stirred while keeping the internal temperature at 25° C. Further, methanol (6.0 g) was dropwise added slowly while keeping the internal temperature at 25° C. or higher.

8 Hours later, stirring was terminated, the crude liquid was subjected to filtration by a pressure filter, and KF was removed. Then, R-113 and excess methanol were completely removed by an evaporator to obtain a product (2.1 g) which was liquid at room temperature.

As a result of analysis, it was confirmed that all the —COF groups present in the product obtained in Example 3 were converted into methyl ester, and the title compound was formed. The product had an average molecular weight (Mn) of 2,484.

$^1$H-NMR (300.4 MHz, solvent: R-113, standard: TMS) δ (ppm): 3.95, 5.9 to 6.4

$^{19}$F-NMR (282.7 MHz, solvent: R-113, standard: CFCl$_3$) δ (ppm): −78.3, −89.5, −90.0 to −92.0, −135.0 to −139.0

Example 4-2

Production Example by esterification

The interior of a 50 mL round flask in which a stirrer chip was charged, was adequately flushed with nitrogen. The product (3.6 g) obtained in the same method as in Example 2-1 and methanol (7.1 g) were added and vigorously stirred while bubbling at room temperature. Nitrogen sealing was carried out on the round flask outlet.

8 Hours later, excess methanol and reaction by-products were distilled off while keeping the interior of the system under reduced pressure by disposing a vacuum pump to the condenser. 3 Hours later, a product (2.4 g) which was liquid at room temperature was obtained.

As a result of analysis of the product, it was confirmed that 99.8% of the number of the ester linkages present in the product obtained in Example 2 were converted to methyl ester, and the title compound was formed. The product had an average molecular weight (Mn) of 2,200.

$^1$H-NMR (300.4 MHz, solvent: R-113, standard: TMS) δ (ppm): 3.95, 5.9 to 6.4

$^{19}$F-NMR (282.7 MHz, solvent: R-113, standard: CFCl$_3$) δ (ppm): −78.3, −89.5, −90.0 to −92.0, −135.0 to −139.0

Example 5

Example for production of HOCH$_2$CF$_2$O(CF$_2$CF$_2$O)$_q$CF$_2$CH$_2$OH

CH$_3$OC(O)CF$_2$O(CF$_2$CF$_2$O)$_q$CF$_2$COOCH$_3$ (40.0 g, q is as defined above) obtained by the process of Example 4-1, R-225 (240 mL) and tetrahydrofuran (200 mL) were mixed, and a borane/tetrahydrofuran complex (40 mL) was added in a stream of nitrogen, followed by stirring at room temperature overnight. The solvent was distilled off by an evaporator, 2 mol/L hydrochloric acid was added to the rest, extraction with R-225 was carried out, and the extract was concentrated to obtain a crude product (35.02 g). The crude product was purified by a silica gel column (eluent: R-225/hexafluoroisopropyl alcohol) to obtain HOCH$_2$CF$_2$O(CF$_2$CF$_2$O)$_q$CF$_2$CH$_2$OH (15.5 g) It was confirmed by $^{19}$FNMR that the compound contained substantially no —(CF$_2$O)— units. As a result of measurement by GPC, the average molecular weight (Mn) was 1,241. The NMR spectrum of the product is shown below.

$^1$H-NMR (300.4 MHz, solvent: R-113, standard: TMS) δ (ppm): 3.94

$^{19}$F-NMR (282.65 MHz, solvent: R-113, standard: CFCl$_3$) δ (ppm): −80.1, −88.2

Example 6

Example for production of HOCH$_2$CH$_2$OCH$_2$CF$_2$O(CF$_2$CF$_2$O)$_q$CF$_2$CH$_2$OCH$_2$CH$_2$OH Example 6-1

Production Example by addition of ethylene carbonate

HOCH$_2$CF$_2$O(CF$_2$CF$_2$O)$_q$CF$_2$CH$_2$OH (8.0 g, q is as defined above) obtained in Example 5, R-419 (10 mL) obtained in Reference Example 2 and ethylene carbonate (1.3 g) were put in a round flask (50 mL) and stirred. Then, potassium fluoride (0.8 g) was added in an atmosphere of nitrogen, a reflux apparatus cooled at 20° C. was disposed at the upper portion of the flask, the apparatus outlet was flushed with nitrogen, and stirring was carried out for 36 hours in such a state while heating at 150° C. to obtain a reaction crude liquid. The liquid was subjected to filtration under pressure by means of a filter (pore size 0.1 μm, made of PTFE), and the solvent in the obtained filtrate was distilled off by an evaporator, to obtain a pale yellow compound (8.4 g) which was liquid at 25° C.

As a result of $^1$H-NMR and $^{19}$F-NMR analyses of the compound, formation of $HOCH_2CH_2OCH_2CF_2O(CF_2CF_2O)_qCF_2CH_2OCH_2CH_2OH$ was confirmed. The product was a mixture of at least two types, and 85% of the hydroxyl groups in the material ($HOCH_2CF_2O(CF_2CF_2O)_qCF_2CH_2OH$) underwent ethylene carbonate addition. Further, it was confirmed by $^{19}$F-NMR that the compound contained substantially no —$(OCF_2O)$— units. As a result of measurement of the compound by GPC, the average molecular weight (Mn) was 1,300.

$^1$H-NMR (300.4 MHz, solvent: R-113, standard: TMS) δ (ppm): 4.31, 3.9, 3.76

$^{19}$F-NMR (282.65 MHz, solvent: R-113, standard: CFCl$_3$) δ (ppm): −77.0, −88.2

Example 6-2

Example by addition of ethylene oxide $HOCH_2CF_2O(CF_2CF_2O)_qCF_2CH_2OH$ (10.0 g, q is as defined above) obtained in the same process as in Example 5 and t-butanol (8.2 g) were charged in an autoclave (100 ml) in an atmosphere of nitrogen and stirred until they were uniformly mixed. A reflux tube of 20° C. the outlet of which was flushed with a nitrogen gas was disposed at the autoclave. Then, potassium t-butoxide (0.22 g) was charged in the autoclave, and the autoclave was heated at 70° C., followed by stirring for 30 minutes. Further, while keeping the internal temperature at 70° C., ethylene oxide (2.1 g) was fed over a period of 2 hours, followed by stirring for 12 hours. The autoclave was cooled to 25° C. and the interior thereof was flushed with a nitrogen gas, and then 0.2 g/L hydrochloric acid (50 mL) was dropwise added to obtain a liquid which was separated into two layers. The organic layer was recovered and R-225 (50 mL) was added thereto, and the resulting solution was washed with distilled water (500 mL) twice and dehydrated with magnesium sulfate, and the solvent was distilled off by an evaporation to obtain a pale yellow compound (10.5 g) which was liquid at 25° C.

As a result of $^1$H-NMR and $^{19}$F-NMR analyses of the compound, formation of $HOCH_2CH_2OCH_2CF_2O(CF_2CF_2O)_qCF_2CH_2OCH_2CH_2OH$ was confirmed. The product was a mixture of at least two types, and 95% of the hydroxyl groups in the material ($HOCH_2CF_2O(CF_2CF_2O)_qCF_2CH_2OH$) underwent ethylene oxide addition. Further, it was confirmed by $^{19}$F-NMR that the compound contained substantially no —$(OCF_2O)$— units. As a result of measurement of the compound by GPC, the average molecular weight (Mn) was 1,300.

$^1$H-NMR (300.4 MHz, solvent: R-113, standard: TMS) δ (ppm): 4.31, 3.9, 3.76

$^{19}$F-NMR (282.65 MHz, solvent: R-113, standard: CFCl$_3$) δ (ppm): −77.0, −88.2

Example 7

Example for production of $HOCH_2CH(OH)CH_2OCH_2CF_2O(CF_2CF_2O)_qCF_2CH_2CH_2OCH_2CH(OH)CH_2OH$ $HOCH_2CF_2O(CF_2CF_2O)_qCF_2CH_2OH$ (10 g, q is as defined above) obtained in the same process as in Example 5 and 2-methyl-2-propanol (5.0 g) were charged in a round flask (250 mL) in an atmosphere of nitrogen and stirred until they were uniformly mixed. A reflux tube of 20° C. the outlet of which was flushed with a nitrogen gas was disposed at the outlet of the round flask. Then, potassium t-butoxide (0.22 g) was charged in the autoclave, and the autoclave was heated at 70° C., followed by stirring for 30 minutes. Then, while keeping the internal temperature at 70° C., 2,3-epoxy-1-propanol (1.62 g) was dropwise added over a period of 2 hours, followed by stirring for 12 hours. The round flask was cooled to 25° C. and the interior thereof was flushed with a nitrogen gas, and then 0.2 g/L hydrochloric acid (50 mL) was dropwise added to obtain a liquid which was separated into two layers. The organic layer of the liquid was recovered and R-225 (50 mL) was added thereto, and the resulting solution was washed with distilled water (500 mL) twice and dehydrated with magnesium sulfate, and the solvent was distilled off by an evaporator to obtain a pale yellow compound (9.7 g) which was liquid at 25° C.

As a result of $^1$H-NMR and $^{19}$F-NMR analyses of the compound, formation of $HOCH_2CH(OH)CH_2OCH_2CF_2O(CF_2CF_2O)_qCF_2CH_2CH_2OCH_2CH(OH)CH_2OH$ was confirmed. The product was a mixture of at least two types, and 90% of the hydroxyl groups in the material ($HOCH_2CF_2O(CF_2CF_2O)_qCF_2CH_2OH$) underwent addition of 2,3-epoxy-1-propanol. Further, it was confirmed by $^{19}$F-NMR that the compound contained substantially no —$(OCF_2O)$— units. As a result of measurement of the compound by GPC, the average molecular weight (Mn) was 1,350.

$^1$H-NMR (300.4 MHz, solvent: R-113, standard: TMS) δ (ppm): 3.45, 3.67, 4.67

$^{19}$F-NMR (282.65 MHz, solvent: R-113, standard: CFCl$_3$) δ (ppm): −77.1, −88.2

Example 8

Example of coating of $HOCH_2CF_2O(CF_2CF_2O)_qCF_2CH_2OH$ $HOCH_2CF_2O(CF_2CF_2O)_qCF_2CH_2OH$ (1 g) obtained in Example 5 and perfluoro(t-butyl)amine (99 g, IL-263, manufactured by TOKUYAMA Corp.) were charged in a glass flask and stirred for 2 hours to obtain a colorless and transparent uniform solution. The solution was spin-coated on the surface of an aluminum plate at a spin rate of 700 rpm for 20 seconds, followed by heat treatment at 80° C. for 1 hour. A transparent film with a thickness of 0.05 μm was formed on the surface of the aluminum plate. The coefficient of friction on the aluminum plate surface remarkably decreased.

Example 9

Test Example for stability of $HOCH_2CF_2O(CF_2CF_2O)_qCF_2CH_2OH$

The mass reduction of the title compound (25 mg, q is as defined above) when heated from 25° C. to 500° C. at a rate of 10° C./min in an atmosphere of nitrogen (100 mL/min), was measured on a differential thermal balance. The mass reduction profile was constant, and excellent stability was exhibited.

Further, the stability test of the title compound (25 mg) when γ-alumina fine powder (0.5 g, N-611N, manufactured by Nikki Chemical Co., Ltd) was present was carried out. The mass reduction profile was constant, and excellent stability was exhibited.

As a Comparative Example, using known perfluoropolyether (FOMBLIN Z DiOL4000 manufactured by Ausimont), the stability test was carried out by the same method and as a result, the whole of the ether momentally decomposed at 250° C. when γ-alumina was present, was converted into low molecular weight compounds and vaporized.

Example 10

Example for production of R-215ca (Reference Example 1)

An U-form reaction tube (inner diameter 2.54 cm, length 600 cm, made of inconel 600) filled with an activated carbon catalyst (250 mL, ash content 1.2 mass %, Shirasagi C2X manufactured by Takeda Pharmaceutical Company, Limited) was immersed in an oil bath, and the oil bath was kept at 200° C. A water trap was disposed at the outlet of the reaction tube. A nitrogen gas at 100 mL/min and a chlorine gas at 600 mL/min were supplied to the reaction tube for 6 hours to remove is unnecessary functional groups in the activated carbon. Then, the oil bath was heated to 250° C., and gasified R-225cb at 240 mL/min and a chlorine gas at 360 mL/min were supplied to the reaction tube to carry out catalyst reaction, to obtain a reaction gas which passed through the water trap and of which the acid contents were thereby removed. The composition of the gas was analyzed by FID gas chromatography and as a result, formation of 99.9 mol % of R-215ca was confirmed. The degree of conversion of R-225cb was 97%.

Example 11

Example for production of R-419 (Reference Example 2)

An U-form reaction tube (inner diameter 2.54 cm, length 600 cm, made of inconel 600) filled with an activated carbon catalyst (250 mL, ash content 1.2 mass %, Shirasagi C2X manufactured by Takeda Pharmaceutical Company, Limited) was immersed in an oil bath, and the oil bath was kept at 200° C. In order to remove the acid content and excess chlorine, an alkaline water trap in which KOH was dissolved and a glass trap cooled at −78° C. were disposed to the reaction tube. A nitrogen gas at 100 mL/min and a chlorine gas at 600 mL/min were supplied to the reaction tube for 6 hours to remove unnecessary functional groups in the activated carbon.

Then, the oil bath was heated to 250° C., and R-225cb at 120 g/h and a chlorine gas at 360 mL/min were supplied to the reaction tube for 20 hours to carry out catalyst reaction and as a result, a liquid which was separated into two layers of an aqueous layer and an organic layer was collected in the water trap, and a liquid comprising an organic layer was collected in the glass trap.

The organic layer in the water trap and the organic layer in the glass trap were recovered and put together to obtain a reaction crude liquid (2,660 g). The reaction crude liquid was analyzed by FID gas chromatography and as a result, formation of 90 mol % of R-215ca was confirmed. The degree of conversion of R-225cb was 97%. The reaction crude liquid was purified by distillation to obtain R-215ca (2,530 g).

Then, AlCl$_3$ (20 g) was added to an autoclave (internal volume 2L, made of hastelloy C), followed by deaeration, and then R-215ca (2,500 g) was added, and the autoclave was heated at 65° C. While keeping the temperature at 65° C. and the pressure under 0.8 MPa (gauge pressure), tetrafluoroethylene (hereinafter referred to as TFE) was continuously supplied to carry out the reaction. 870 g (8.7 mol) of TFE was added and then the supply was terminated, and stirring was further continued for 1 hour and then the reaction was completed. After the reaction liquid was cooled to 25° C., the catalyst was separated by filtration from the reaction liquid to obtain a reaction crude liquid (3,250 g). The composition of the reaction crude liquid was analyzed by FID gas chromatography and $^{19}$F-NMR and as a result, it was confirmed that the rate of reaction of R-215ca was 90%, and the selectivity of R-419 was 53%. The reaction crude liquid was distilled and as a result, 99.9 mol % R-419 (1,300 g) was obtained.

$^{19}$F-NMR (282.65 MHz, solvent: R-113, standard: CFCl$_3$) δ (ppm): −61.6, −76.1, −105.4, −112.3

INDUSTRIAL APPLICABILITY

A perfluoropolyether derivative provided by the present invention is a compound useful as a lubricating oil or a coating material. For example, it is useful as a lubricant for magnetic disks. Further, it is useful as a surface treating agent, and it imparts to the surface of a base material functions such as low refractive index properties, heat resistance, lubricating properties, adhesive properties, antiglare properties, moisture resistance, stain resistance, water and oil repellency, chemical resistance, abrasion resistance and electrostatic resistance. Further, the present invention provides a thin film having such properties.

The entire disclosure of Japanese Patent Application No. 2002-304641 filed on Oct. 18, 2002 including specification, claims and summary is incorporated herein by reference in its entirety.

What is claimed is:

1. A compound represented by the following formula (1):

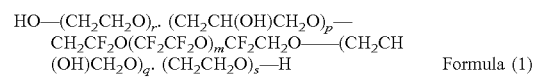

Formula (1)

wherein m represents the number of —(CF$_2$CF$_2$O)— units and is an integer of from 3 to 200, each of r and s which are independent of each other, represents the number of —(CH$_2$CH$_2$O)— units and is an integer of from 0 to 100, and each of p and q which are independent of each other, represents the number of —(CH$_2$CH(OH)CH$_2$O)— units and is an integer of from 1 to 100, provided that when each of r and p which are independent of each other, is an integer of at least 1, or when each of q and s which are independent of each other, is an integer of at least 1, the arrangement of —(CH$_2$CH$_2$O)— and —(CH$_2$CH(OH)CH$_2$O)— units is not particularly limited, and when one of r and p is an integer of at least 2 and the other is an integer of at least 1, or when one of q and s is an integer of at least 2 and the other is an integer of at least 1, —(CH$_2$CH$_2$O)— and —(CH$_2$CH(OH)CH$_2$O)— units may be arranged in a block form or at random.

2. The compound according to claim 1, wherein each of r and s which are independent of each other, is an integer of from 1 to 100, or each of p and q which are independent of each other, is an integer of from 1 to 100.

3. The compound according to claim 1, p and q are 1 and r and s are 0.

4. The compound according to claim 1, wherein m is an integer of from 3 to 100.

5. A compound represented by the following formula (1):

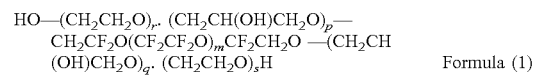

Formula (1)

wherein m represents the number of —(CF$_2$CF$_2$O)— units and is an integer of from 3 to 200, each of r and s which are independent of each other, represents the number of —(CH$_2$CH$_2$O)— units and is an integer of from 0 to 100, and each of p and q which are independent of each other, represents the number of —(CH$_2$CH(OH)CH$_2$O)— units and is an integer of 1, provided that when each of r and p which are independent of each other, is an integer of at least 1, or when each of q and s which are independent of each other, is an integer of at least 1, the arrangement of —CH$_2$CH$_2$O)— and —(CH$_2$CH(OH)CH$_2$O)— units is not particularly limited, and when r is an integer of at least 2 or when s is an integer of at least 2, —(CH$_2$CH$_2$O)— and —(CH$_2$CH(OH)CH$_2$O)— units may be arranged in a block form or at random.

6. The compound according to claim 5, wherein each of r and s which are independent of each other, is an integer of from 1 to 100.

7. The compound according to claim 5, wherein m is an integer of from 3 to 100.

8. A compound represented by the following formula (1):

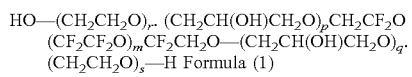
HO—(CH$_2$CH$_2$O)$_r$·(CH$_2$CH(OH)CH$_2$O)$_p$CH$_2$CF$_2$O(CF$_2$CF$_2$O)$_m$CF$_2$CH$_2$O—(CH$_2$CH(OH)CH$_2$O)$_q$·(CH$_2$CH$_2$O)$_s$—H  Formula (1)

wherein m represents the number of —(CF$_2$CF$_2$O)— units and is an integer of from 3 to 200, each of r and s which are independent of each other, represents the number of —(CH$_2$CH$_2$O)— units and is an integer of from 1 to 100, and each of p and q which are independent of each other, represents the number of —(CH$_2$CH(OH)CH$_2$O)— units and is an integer of from 1 to 100, provided that when each of r and p which are independent of each other, is an integer of at least 1, or when each of q and s which are independent of each other, is an integer of at least 1, the arrangement of —(CH$_2$CH$_2$O)—and —(CH$_2$CH(OH)CH$_2$O)— units is not particularly limited, and when one of r and p is an integer of at least 2 and the other is an integer of at least 1, or when one of q and s is an integer of at least 2 and the other is an integer of at least 1, —(CH$_2$CH$_2$O)— and —(CH$_2$CH(OH)CH$_2$O)— units may be arranged in a block form or at random.

9. The compound according to claim 8, wherein m is an integer of from 3 to 100.

* * * * *